(12) United States Patent
Cleghorn et al.

(10) Patent No.: US 8,161,176 B2
(45) Date of Patent: Apr. 17, 2012

(54) SYSTEM AND METHOD FOR PROVIDING CONNECTIVITY BETWEEN USING DIFFERENT NETWORKS USING DIFFERENT PROTOCOLS

(75) Inventors: Monica Rose Cleghorn, Plano, TX (US); Kevin V Nguyen, Allen, TX (US)

(73) Assignee: Accudata Technologies, Inc., Allen, TX (US)

( * ) Notice: Subject to any disclaimer, the term of this patent is extended or adjusted under 35 U.S.C. 154(b) by 170 days.

(21) Appl. No.: 12/610,573

(22) Filed: Nov. 2, 2009

(65) Prior Publication Data
US 2010/0049861 A1 Feb. 25, 2010

Related U.S. Application Data

(63) Continuation of application No. 10/224,925, filed on Aug. 20, 2002, now Pat. No. 7,644,169, and a continuation-in-part of application No. 09/964,954, filed on Sep. 27, 2001, now Pat. No. 7,373,335.

(51) Int. Cl.
*G06F 15/16* (2006.01)

(52) U.S. Cl. .......................... 709/230; 709/232; 709/245

(58) Field of Classification Search .................. 709/230, 709/232, 245
See application file for complete search history.

(56) References Cited

U.S. PATENT DOCUMENTS

| | | | |
|---|---|---|---|
| 6,246,999 B1 * | 6/2001 | Riley et al. ...................... | 705/30 |
| 6,332,133 B1 * | 12/2001 | Takayama ........................ | 705/39 |
| 6,549,937 B1 * | 4/2003 | Auerbach et al. .............. | 709/206 |
| 6,735,621 B1 * | 5/2004 | Yoakum et al. ................ | 709/218 |
| 6,950,876 B2 * | 9/2005 | Bright et al. ................... | 709/230 |

* cited by examiner

*Primary Examiner* — Mohamed Wasel (57) ABSTRACT

A system and method for providing message connectivity between a first network using a first protocol and a second network using a second protocol is described. If a message is received from the first network, the message is processed using one or more digital signal processors, a destination in the second network is determined, the processed message is logged and translated into the second protocol, and the translated message is sent to the destination in the second network. If the message is received from the second network, the message is translated into the first protocol, a destination in the first network is determined, the translated message is logged and processed using one or more digital signal processors, and the processed message is sent to the destination in the first network. One example method can be implemented as a computer program embodied on a computer readable medium.

19 Claims, 6 Drawing Sheets

SYSTEM AND METHOD FOR PROVIDING CONNECTIVITY BETWEEN USING DIFFERENT NETWORKS USING DIFFERENT PROTOCOLS

CROSS-REFERENCE TO RELATED APPLICATION

This application is a continuation of and claims priority to U.S. patent application Ser. No. 10/224,925 which in turn is a continuation-in-part of U.S. patent application Ser. No. 09/964,954 filed on Sep. 27, 2001, now issued Pat. No. 7,373,335, the entire contents of each of which are incorporated by reference herein.

TECHNICAL FIELD OF THE INVENTION

The present invention relates generally to the field of communications and, more particularly, to a system and method for providing connectivity between two different networks using different protocols.

BACKGROUND OF THE INVENTION

Despite the fact that the government requires existing telecommunication service companies to allow competitors to access their facilities and databases to the extent necessary to provide competitive services, obtaining quick and reliable access to the information contained in these databases has been difficult, if not impossible. For example, competitive local exchange carriers ("CLEC") have not had an easy-to-use, near real-time or real-time system that can access an incumbent local exchange carrier's ("ILEC") database to determine whether a phone number will accept a collect call.

Similarly, the increased use of the Internet for purchasing goods and services has increased the pressure to validate and check pending transactions before they are completed. For example, an Internet retailer would like to determine whether a potential customer's credit card or banking card is valid and whether the account has the credit or funds to pay for the proposed transaction.

In each of the cases described above, a database query will most likely have to cross network boundaries, some of which may use proprietary or legacy protocols. As a result, the processing of these queries is difficult, slow and cumbersome. In addition, gateways located at these boundaries between different networks that use different protocols have traditionally used custom equipment that is both expensive and difficult to integrate into an existing system. For example, Internet Protocol Signal Transfer Point ("IP-STP") communications capabilities in the telecommunications industry have been only possible via fixed traditional communication links commonly referred to as 56K links, A-Links, D-Links or the like. Accordingly, there is a need for a system and method for providing connectivity between two different networks using different protocols that is inexpensive, efficient and easy to install.

SUMMARY OF THE INVENTION

The present invention provides a system and method for providing connectivity between two different networks using different protocols. The present invention can be easily installed on one or more off-the-shelf computers or servers. Moreover, the present invention can create, accept and track messages in the more commonly used protocols, such as the Internet Protocol ("IP"), and translate them into proprietary or legacy protocols in real or near-real time. In addition, the IP-STP provided by the present invention allows IP connectivity to SS7 networks in a secure mode and allows programming of specific applications. As a result, the present invention provides an efficient and inexpensive gateway to process messages between two different networks using different protocols.

The present invention provides a method for providing message connectivity between a first network using a first protocol and a second network using a second protocol. If a message is received from the first network, the message is processed using one or more digital signal processors, a destination in the second network is determined, the processed message is logged and translated into the second protocol, and the translated message is sent to the destination in the second network. If the message is received from the second network, the message is translated into the first protocol, a destination in the first network is determined, the translated message is logged and processed using one or more digital signal processors, and the processed message is sent to the destination in the first network. This method can be implemented as a computer program embodied on a computer readable medium.

In addition, the present invention provides a system for providing message connectivity between a first network using a first protocol and a second network using a second protocol. The system includes a computer, a first network interface communicably coupling the computer to the first network, a second network interface communicably coupling the computer to the second network, and a computer program resident on the computer. The computer program includes a code segment that whenever the message is received at the first network interface, processes the message using one or more digital signal processors, determines a destination in the second network for the processed message, logs the processed message, translates the processed message into the second protocol and sends the translated message to the destination in the second network via the second network interface. The computer program also includes a code segment that whenever the message is received at the second network interface, translates the message into the first protocol, determines a destination in the first network for the translated message, logs the translated message, processes the translated message using one or more digital signal processors and sends the processed message to the destination in the first network via the first network interface.

Other features and advantages of the present invention shall be apparent to those of ordinary skill in the art upon reference to the following detailed description taken in conjunction with the accompanying drawings.

BRIEF DESCRIPTION OF THE DRAWINGS

For a better understanding of the invention, and to show by way of example how the same may be carried into effect, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. For example, in addition to telecommunications systems and the Internet, the present invention may be applicable to other forms of communications or general data processing. Other forms of communications may include communications between networks, communications via satellite, or any form of communications not yet known to man as of the date of the present invention. The specific embodiments discussed herein are merely illustrative of specific ways to make and use the invention and do not limit the scope of the invention.

The present invention provides a system and method for providing connectivity between two different networks using different protocols. The present invention can be easily installed on one or more off-the-shelf computers or servers. Moreover, the present invention can create, accept and track messages in the more commonly used protocols, such as the Internet Protocol ("IP"), and translate them into proprietary or legacy protocols in real or near-real time. In addition, the Internet Protocol Signal Transfer Points ("IP-STP") provided by the present invention allows IP connectivity to SS7 networks in a secure mode and allows programming of specific applications. As a result, the present invention provides an efficient and inexpensive gateway to process messages between two different networks using different protocols.

Figure 1:
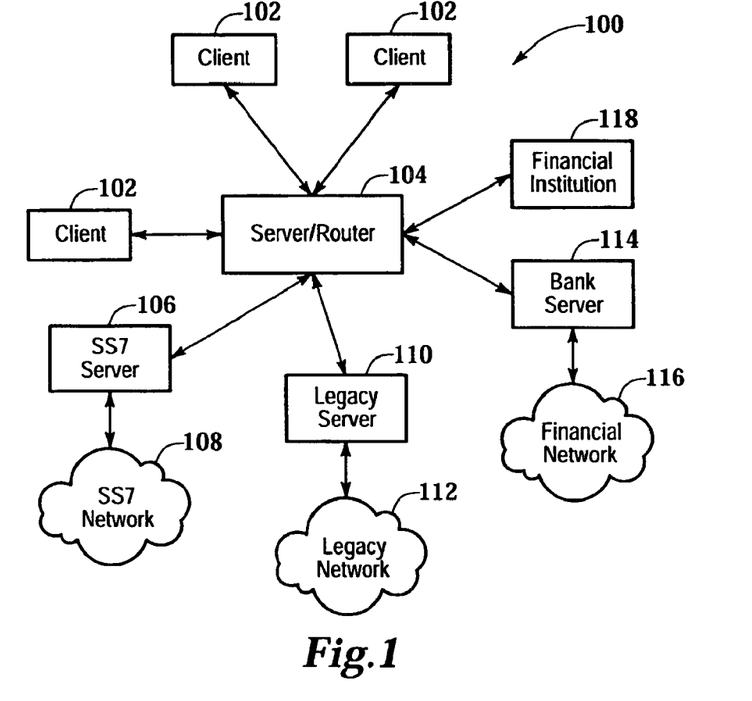
FIG. 1 is a block diagram of a network in accordance with one embodiment of the present invention.

Referring to FIG. 1, a block diagram of a network 100 in accordance with one embodiment of the present invention is shown. The network 100 includes one or more clients 102 communicably coupled to a server/router 104. The server/router 104 is communicably coupled to a Signaling System 7 ("SS7") network 108 via SS7 server 106, one or more legacy networks 112 via legacy servers 110, and one or more financial networks 116 via bank server 114. One or more financial institutions 118 may also be communicably coupled to the server/router 104. The clients 102 are computers or other devices that submit database queries for processing via the server/router 104. The functions of the server/router 104 can be split on separate computers or processing devices. The servers 106, 110 and 114 function as gateways between the network where the server/router 104 is resident and the networks 108, 112 and 116 where the databases are resident.

One or more databases, data storage devices, computers or information sources responsive to database queries submitted by the clients 102 and financial institution 118 are resident within networks 108, 112 and 116. The database queries can be of any type known to those skilled in the art. For example, the database queries may be part of a call validation process, a call billing process, a bank card validation process, or a bank card settlement process. The devices 102, 104, 106, 110, 114 and 118 can be communicably coupled via a local network, a wide area network, such as the Internet, satellite links, dedicated communication links, dial-up modems, or any other method of establishing a communication link between two devices. Communications between the various devices 102, 104, 106, 110, 114 and 118 can be sent in the clear or encrypted.

Figure 2:
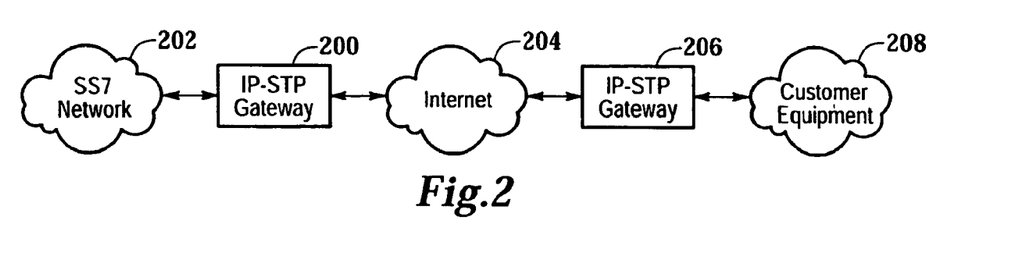
FIG. 2 illustrates the use of the present invention as a gateway between various networks.

Referring now to FIG. 2, the use of the present invention as a gateway 200 and 206 between various networks 202, 204 and 208 is shown. Gateway 200 provides connectivity between a first network 202 (SS7 signaling network) and a second network 204 (Internet network). Likewise, gateway 206 provides connectivity between the second network 204 (Internet network) and a third network 208 (Customer Equipment). Note that the first, second and third networks can be of any type and are not limited to the examples shown in FIG. 2. Gateways 200 and 206 are IP-STP that provide connectivity between an Internet network 204 and another network 204 or 208. The STP is a telecommunication switch or router that processes signaling messages, such as SS7, and routes traffic through the signaling network. Traditional suppliers of prior art STP equipment are Tekelec, Alcatel and Nortel.

Unlike prior art STP equipment, gateway 200 and 206 of the present invention can be implemented using an off-the-shelf computer with the software described herein. The computer or server 200 and 206 will have a first network interface communicably coupling the computer 200 and 206 to the first network 202 or 208. Similarly, the computer or server 200 and 206 will have a second network interface communicably coupling the computer 200 and 206 to the second network 204. For example, gateway 200 and 206 can be a Pentium.RTM. 4 or higher class server with at least 1 GHz processing speed and at least a 20 GB hard drive, such as those supplied by Dell, Gateway or Hewlett-Packard. Gateway 200 and 206 also include a digital signal processing ("DSP") board with SS7 communication capability as the interface to the SS7 network 204, such as those supplied by Natural Microsystems or Dialogic. Standard SS7-IP encoding software, also referred to as SigTran software, which is available from Trillium or Convergent Software, Inc., is also installed on gateways 200 and 206. The remaining software is provided by Revenue Communications and is described herein. The DSP board, SigTran software and Revenue Communications software provide the processing described below in reference with FIGS. 3A and 3B.

Figure 3A:
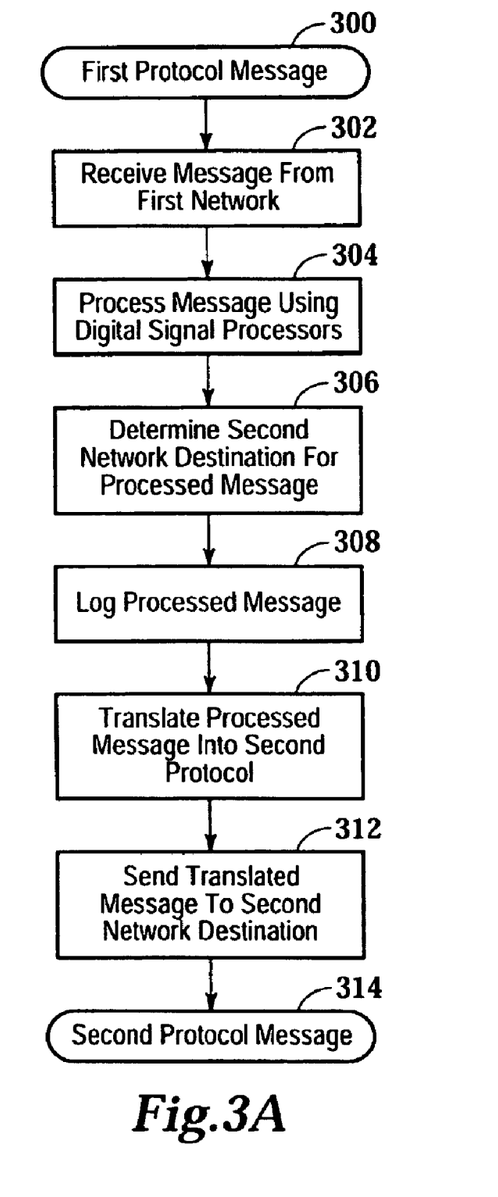
FIGS. 3A and 3B are flowcharts depicting the method of providing connectivity between a first network and a second network in accordance with the present invention.
Figure 3B:
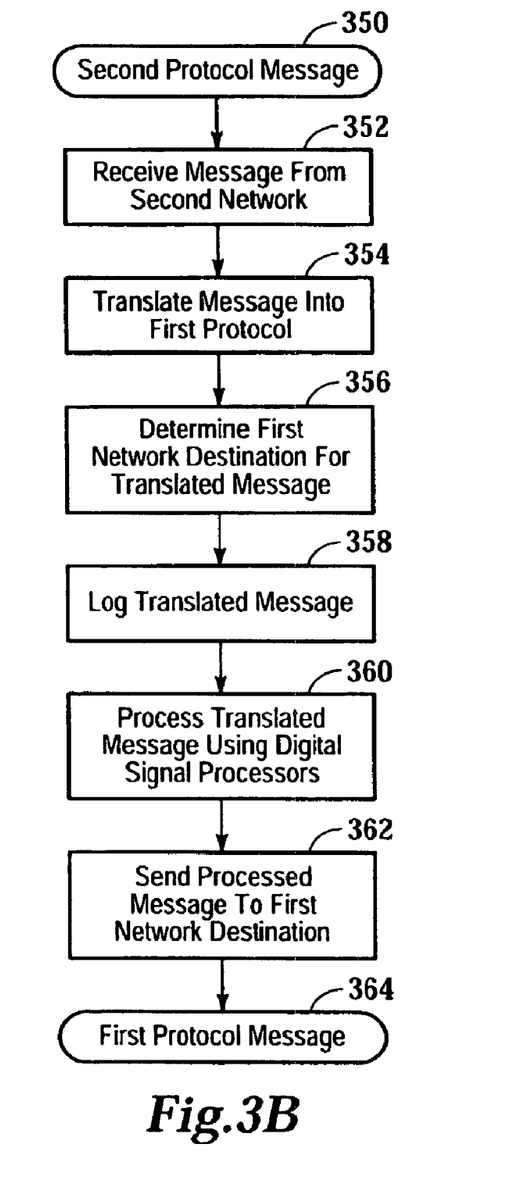

Now referring to FIGS. 3A and 3B, flowcharts depicting the method of providing connectivity between a first network 202 or 208 (FIG. 2) and a second network 204 (FIG. 2) in accordance with the present invention are shown. Specifically, FIG. 3A depicts the translation or conversion of a message from the first network to the second network. A message in a first protocol 300 is received from the first network in block 302. The message 300 is processed using one or more digital signal processors in block 304 and a destination in the second network for the processed message is determined in block 306. The processed message is logged in block 308 and translated into the second protocol in block 310. Thereafter the translated message is sent to the destination in the second network in block 312. The translated message is a message in the second protocol 314. The first protocol can be a signaling protocol, such as SS7, or other network protocol, such as for legacy system. The second protocol can be an Internet protocol, such as TCP/IP.

Similarly, FIG. 3B depicts the translation or conversion of a message from the second network to the first network. A message in the second protocol 350 is received from the second network in block 352. The message 350 is then translated into the first protocol in block 354 and a destination in the first network is determined in block 356. Thereafter, the translated message is logged in block 358 and processed using one or more digital signal processors in block 360. The processed message is then sent to the destination in the first network in block 362. The processed message is a message in the first protocol 364. The first protocol can be a signaling protocol, such as SS7, or other network protocol, such as for a legacy system. The second protocol can be an Internet protocol, such as TCP/IP.

The messages described above can be requests or responses to a previous message or database queries. In addition, the process described above may also include the steps of validating the message, sending a time out response to the originator of the message whenever a response to the message has not been received within a specified time period, storing an address identifier for the originator of the message, storing a query identifier for the message, or decrypting or encrypting the message. The process can be part of a call validation process, call billing process, or bank card validation/settlement process. As previously mentioned, these methods can be implemented as a computer program embodied on a computer readable medium or as a combination of software and hardware.

Figure 4A:
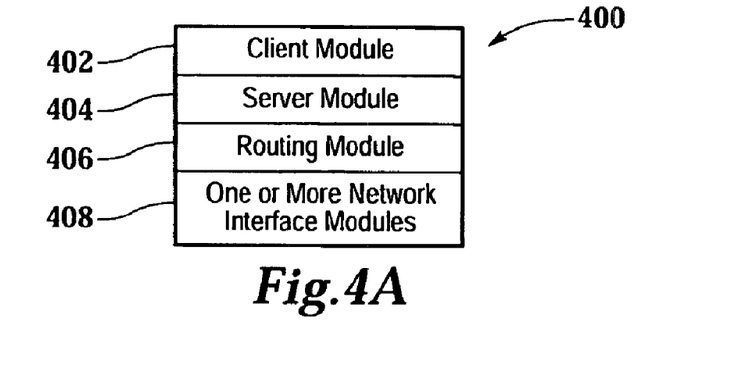
FIGS. 4A and 4B are block diagrams of various implementations of the present invention.
Figure 4B:
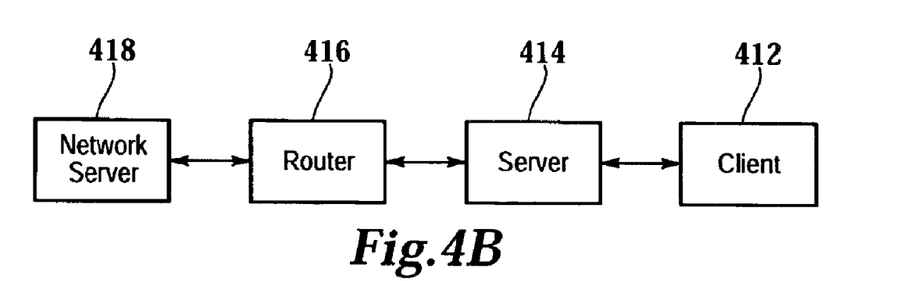

Now referring to FIGS. 4A and 4B, block diagrams of various implementations of the present invention are shown. FIG. 4A shows an implementation of the present invention wherein the functionality of the client 102 (FIG. 1), server/router 104 (FIG. 1) and server 106, 110 or 114 (FIG. 1) are combined on a single device 400. The device 400, which may be a computer, includes a client module 402, a server module 404, a routing module 406 and one or more network interface modules 408.

The client module 402 is a user application interface that allows the user to easily and seamlessly create a database query without having special knowledge of the system, network or database that will process the database query. The client module 402 can be run in a demand mode where the user decides when to send a database query or in an automatic mode where a database query is automatically created and sent in response to one or more events. The client module 402 will also present the results of the database query in an easy to understand format.

The server module 404 is capable of dealing with many instances of the client module 402 wherever they reside. The server module 404 validates the client module 402 before any database queries are forwarded to the routing module 406. In addition, the server module 404 is responsible for receiving database queries from the client module 402 and sending responses to those queries to the appropriate client module 402.

The routing module 406 selects the network interface 408 and the database to send the database query to and then sends the database query to the selected network interface 408. When the routing module 406 receives a response to a database query, it determines which of the client modules 402 sent the database query and then sends the response to that client module 402.

The network interface module 408 translates the database query from a first protocol to a second protocol. The first protocol is used by the network where the database query originated and the second protocol is used by the network where the database resides. For example, the first protocol could be an IP or Internet capable protocol. Likewise, the second protocol could be a signaling protocol, such as SS7, or a proprietary protocol used by the database owner. The network interface module 408 then sends the translated database query to the selected database for processing. Thereafter, the network interface module 408 receives a response from the selected database and translates it from the second protocol to the first protocol. The translated response is then sent to the routing module 406.

FIG. 4B shows an implementation of the present invention wherein the functionality of the client 102 (FIG. 1), server/router 104 (FIG. 1) and server 106, 110 or 114 (FIG. 1) are separated and placed on multiple devices 412, 414, 416 and 418. The client 412, which may be a computer, includes the client module. The server 414, which may be a computer, includes the server module. The router 416, which may be a computer, includes the routing module. The network server 418, which may be a computer, includes one or more of the network interface modules. The contrast between FIGS. 4A and 4B demonstrates the versatility of the present invention.

Figure 5:
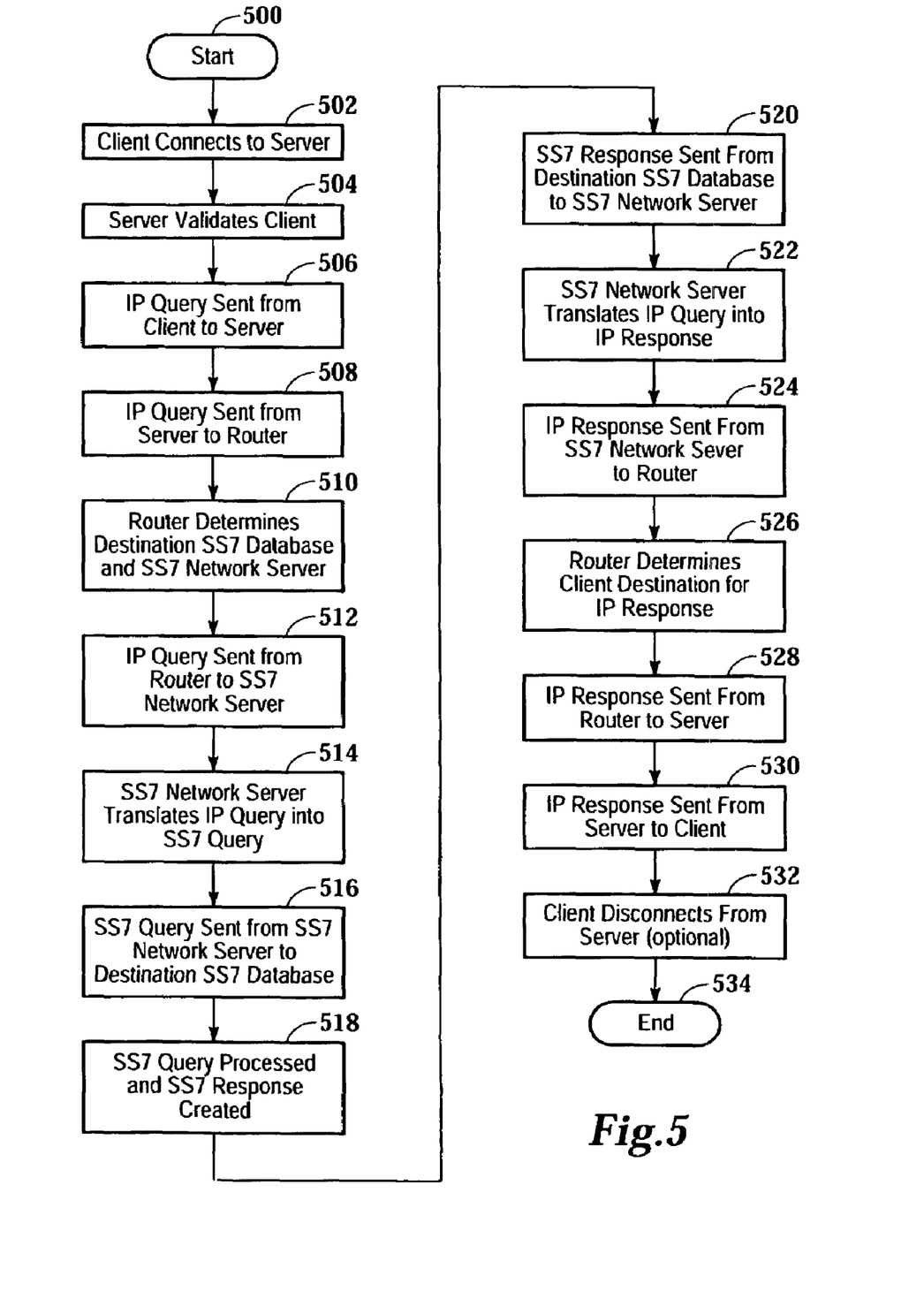
FIG. 5 is a flowchart of an IP to SS7 translation method in accordance with one embodiment of the present invention.

Referring now to FIGS. 4B and 5, a flowchart of an IP to SS7 translation method in accordance with one embodiment of the present invention is shown in FIG. 5. The process starts in block 500. The client 412 connects to the server 414 in block 502 and the server 414 validates the client 412 in block 504. If the client 412 is successfully validated, an IP Query (a database query in an IP format—the first protocol) is sent from the client 12 to the server 414 in block 506. The IP Query is then sent from the server 414 to the router 416 in block 508 where the router 416 determines the destination SS7 database and the SS7 network server 418 to which the IP Query should be sent in block 510. The IP Query is sent from the router 416 to the SS7 network server 418 in block 512 where the SS7 network server 418 translates the IP Query into a SS7 Query (a database query in a SS7 format—the second protocol) in block 514. The SS7 Query is sent to the destination SS7 database for processing in block 516.

The destination SS7 database processes the SS7 Query and creates a SS7 Response in block 518. Those skilled in the art will recognize that the actual processing of the SS7 Query may be accomplished with a database interface application or other type of management software to control and handle queries to the database. The SS7 Response is then sent from the SS7 destination database to the SS7 network server 418 in block 520 where the SS7 network server 418 translates the SS7 Response (a database response in a SS7 format—the second protocol) into an IP Response (a database response in an IP format—the first protocol) in block 422. The IP Response is sent from the SS7 network server 418 to the router 416 in block 524 where the router 416 determines the client destination for the IP Response in block 526. The IP Response is then sent from the router 416 to the server 414 in block 528 and then from the server 414 to the client 412 in block 530. The client 412 can then either disconnect from the server 414 in block 532 or repeat the process previously described for new database queries. Once disconnected, the process ends in block 534. Those skilled in the art will recognize that the process described in FIG. 5 is not limited to the use of the IP and SS7 protocols.

Figure 6A:
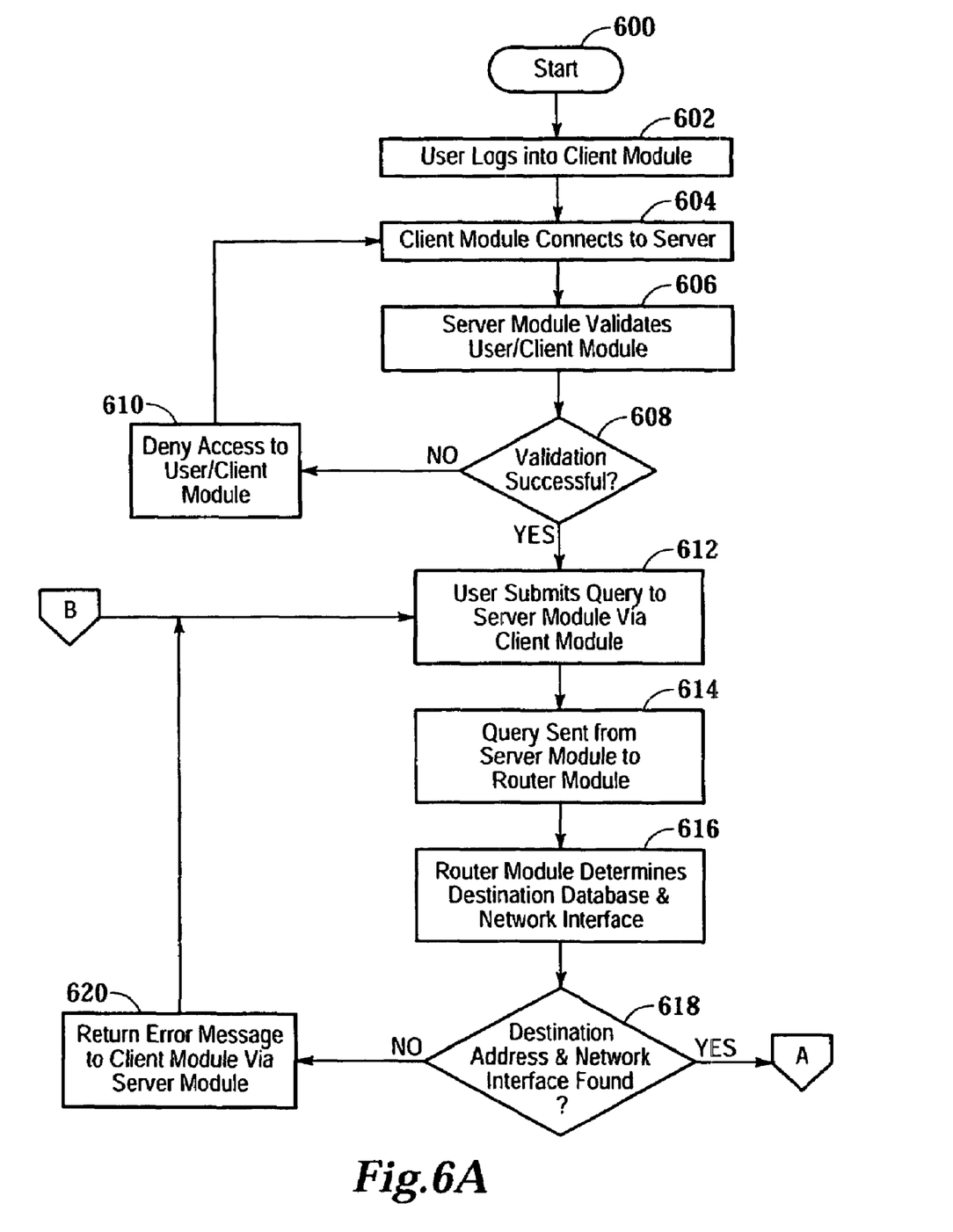
FIGS. 6A, 6B and 6C are schematic diagrams of a more detailed generic translation method in accordance with one embodiment of the present invention.
Figure 6B:
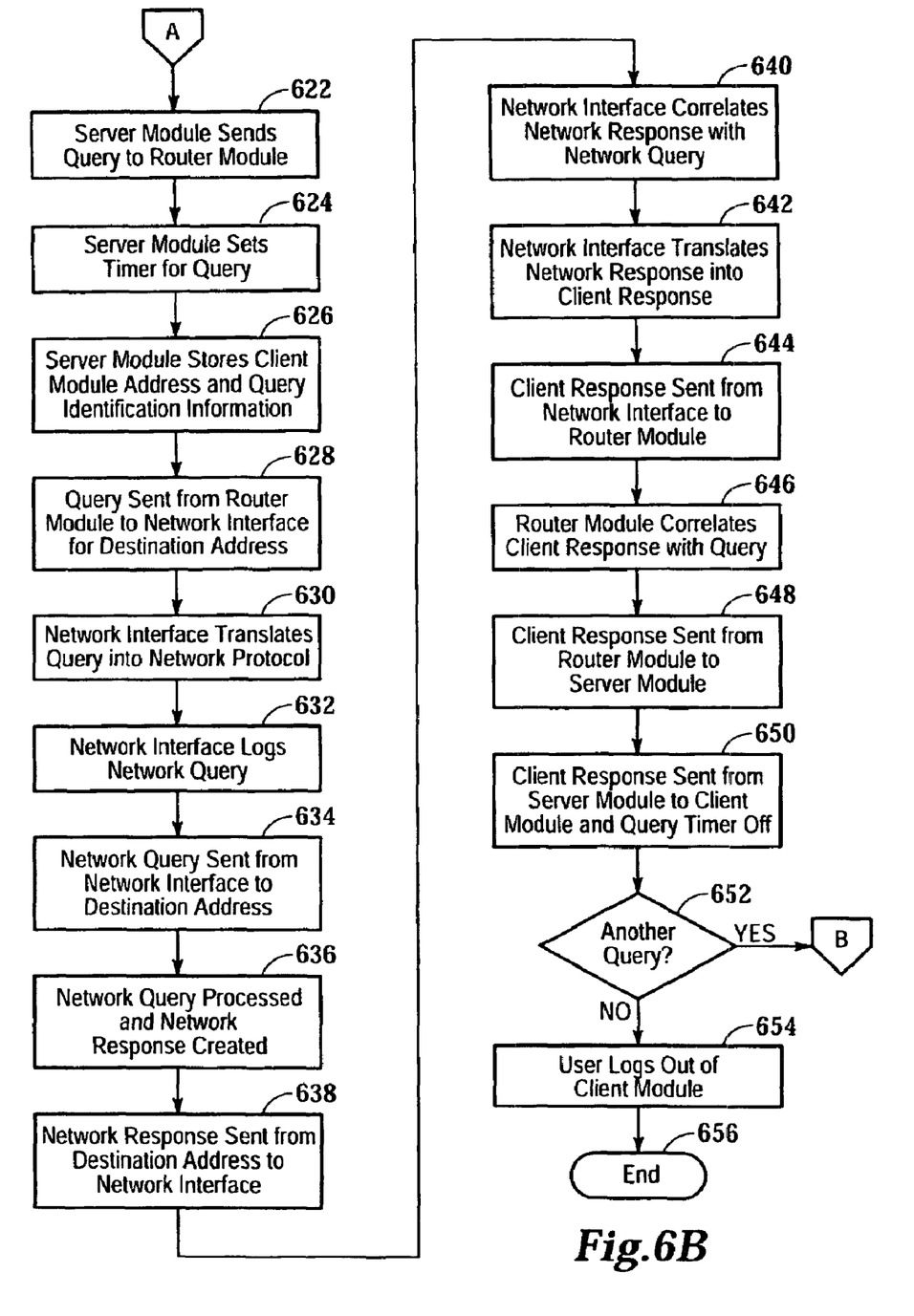
Figure 6C:
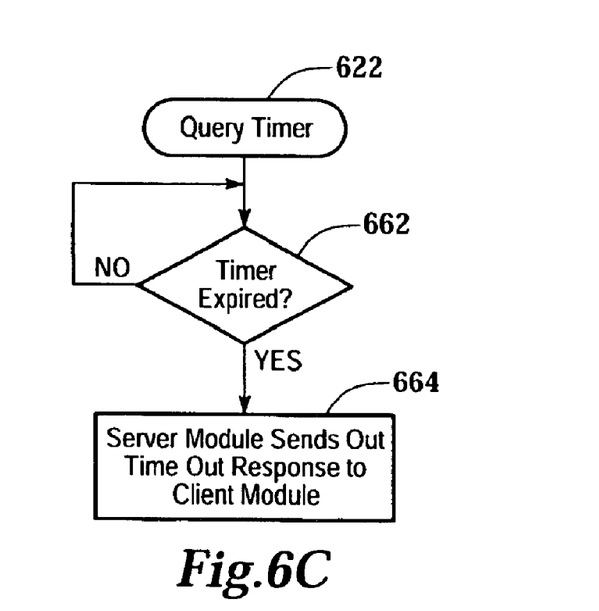

Now referring to FIGS. 6A, 6B and 6C, schematic diagrams of a more detailed generic translation method in accordance with one embodiment of the present invention are shown. The process starts in block 600. The user logs into the client module in block 602 and the client module connects to the server module in block 604. The server module validates the user and/or client module in block 606. If the validation is not successful, as determined in decision block 608, the server module denies access to the user and/or client module in block 610 and the process loops back to allow the user and/or client module to try again in block 602 or 604.

If, however, the validation is successful, as determined in decision block 608, the user submits a query, which is formatted in a first protocol, to the server module via the client module in block 612. The query is then sent from the server module to the router module in block 614 where the router module determines the destination database and network interface module in block 616. If the destination address (database) and network interface module are found, as determined in decision block 618, an error message is returned to the client module via the server module in block 620 and the process loops back to allow the user to submit another query in block 612.

If, however, the destination address (database) and network interface module are found, as determined in decision block 618, the server module sends the query to the router module in block 622 and the server module sets a timer for the query in block 624. The server module also stores the client module address and query identification information in block 626 so that the response to the query can be sent to the correct client module. The query is then sent from the router module to the network interface module for the destination address (destination network server and database) in block 628. The network interface module translates the query into a network query (a database query formatted in the second protocol) in block 630. The network interface module then logs the network query in block 632 and sends the network query to the destination address (database) for processing in block 634.

The destination database processes the network query and creates a network response in block 636. Those skilled in the art will recognize that the actual processing of the network query may be accomplished with a database interface application or other type of management software to control and handle queries to the database. The network response is then sent from the destination address (database) to the network interface module in block 638 where the network interface module correlates the network response with the corresponding network query in block 640. The network interface module translates the network response (a database response in the second protocol format) into a client response (a database response in the first protocol format) in block 642. The client response is sent from the network interface module to the router module in block 644 where the router module correlates the client response with the query (determines the proper client module) in block 646. The client response is then sent from the router module to the server module in block 648 and then from the server module to the client module in block 650. The query timer is also turned off in block 650. If there are no other queries, as determined by decision block 652, the user logs out of the client module in block 654 and the process ends in block 656. If, however, there is another query, as determined in decision block 652, the process loops back to receive another query from the user in block 612.

After the query has been sent by the server module in block 622, the query timer monitors where a response to the query has been received. If the timer has not expired, as determined in decision block 662, the query timer continues to wait for a response. If, however, the timer has expired, as determined in decision block 662, the server module sends a time out response to the client module in block 664. As previously described, the client module, server module, router module and network interface module can be separated or combined in any configuration that fits the application of the present invention.

If encrypted messages are required, the steps of sending the translated database query to the selected database for processing and receiving a response to the database query from the selected database will be performed using the following steps. The translated database query is first encrypted. Thereafter, the encrypted database query is sent to the selected database for processing. With respect to the responses, the encrypted response to the encrypted database query is received from the selected database. Thereafter, the encrypted response is decrypted into a response. Any type of standard encryption/decryption method can be used. For example, the present invention can be used to find out information about a specific telephone number. In such a case, the user uses the client module to create and submit a query using the telephone number to the server module. The router then selects the proper database, which is usually a line information database ("LIDB") located on an ILEC's signaling network, to process the query. The response from the database can then be used to process a call related to the telephone number. Similarly, the user can submit a calling card number, credit card number or bank card number.

The embodiments and examples set forth herein are presented to best explain the present invention and its practical application and to thereby enable those skilled in the art to make and utilize the invention. However, those skilled in the art will recognize that the foregoing description and examples have been presented for the purpose of illustration and example only. The description as set forth is not intended to be exhaustive or to limit the invention to the precise form disclosed. Many modifications and variations are possible in light of the above teaching without departing from the spirit and scope of the following claims.

What is claimed is:

1. A method of providing message connectivity between a first network using a first protocol and a second network using a second protocol, the method comprising the steps of:
   receiving a message from either the first network or the second network, the message related to information about a telephone number, the message sent using the telephone number;
   whenever the message is received from the first network, processing the message using one or more digital signal processors, translating the processed message into the second protocol and sending the translated message to a destination in the second network; and
   whenever the message is received from the second network, translating the message into the first protocol, processing the translated message by a line information database using one or more digital signal processors, and sending the processed message to a destination in the first network, the processed message used to process a call related to the telephone number.

2. The method as recited in claim 1, further comprising at least one of the steps of:
   determining a destination in the second network for the processed message; logging the processed message;
   determining a destination in the first network for the translated message; and logging the translated message.

3. The method as recited in claim 1, further comprising the step of validating the message.

4. The method as recited in claim 1, wherein the message is at least one of: a request, and a response to a previous message.

5. The method as recited in claim 1, further comprising the step of sending a time out response to the originator of the message whenever a response to the message has not been received within a specified time period.

6. The method as recited in claim 1, further comprising the step of storing an address identifier for the originator of the message.

7. The method as recited in claim 1, further comprising the step of storing a query identifier for the message.

8. The method as recited in claim 1, further comprising the step of decrypting the message.

9. The method as recited in claim 1, further comprising the step of encrypting the processed message.

10. The method as recited in claim 1, wherein the first protocol is a signaling protocol.

11. The method as recited in claim 10, wherein the signaling protocol is a Signaling System 7 protocol.

12. The method as recited in claim 1, wherein the second protocol is an Internet protocol.

13. The method as recited in claim 12, wherein the signaling protocol is a TCP/IP protocol.

14. The method as recited in claim 1, wherein the message is at least one of:
a database query;
part of a call validation process;
part of a call billing process;
part of a bank card validation process; and
part of a bank card settlement process.

15. A computer program embodied on a non-transitory computer readable storage medium for providing message connectivity between a first network using a first protocol and a second network using a second protocol, the computer program being executed by a processor, the computer program comprising:
a code segment for receiving a message from either the first network or the second network, the message related to information about a telephone number, the message sent using the telephone number;
a code segment for whenever the message is received from the first network, processing the message using one or more digital signal processors, translating the processed message into the second protocol and sending the translated message to a destination in the second network; and
a code segment for whenever the message is received from the second network, translating the message into the first protocol, processing the translated message by a line information database using one or more digital signal processors and sending the processed message to a destination in the first network, the processed message used to process a call related to the telephone number.

16. A system for providing message connectivity between a first network using a first protocol and a second network using a second protocol, the system comprising:
a computer;
a first network interface communicably coupling the computer to the first network;
a second network interface communicably coupling the computer to the second network; and
a computer program resident on the computer comprising:
a code segment for whenever the message is received at the first network interface, processing the message using one or more digital signal processors, translating the processed message into the second protocol and sending the translated message to a destination in the second network via the second network interface; and
a code segment for whenever the message is received at the second network interface, translating the message into the first protocol, processing the translated message by a line information database using one or more digital signal processors and sending the processed message to a destination in the first network via the first network interface, the processed message used to process a call related to a telephone number.

17. A method of providing connectivity between a first network using a first protocol and a second network using a second protocol, comprising:
receiving a message from either the first network or the second network, the message related to information about a telephone number, the message sent using the telephone number;
whenever the message is received from the first network, translating the processed message into the second protocol and sending the translated message to a destination in the second network; and
whenever the message is received from the second network, translating the message into the first protocol, processing the translated message by a line information database and sending the translated message to a destination in the first network.

18. A computer program embodied on a non-transitory computer readable storage medium for providing connectivity between a first network using a first protocol and a second network using a second protocol, the computer program being executed by a processor, the computer program comprising:
a code segment for receiving a message from either the first network or the second network, the message related to information about a telephone number, the message sent using the telephone number;
a code segment for whenever the message is received from the first network, translating the processed message into the second protocol and sending the translated message to a destination in the second network; and
a code segment for whenever the message is received from the second network, translating the message into the first protocol, processing the translated message by a line information database and sending the translated message to a destination in the first network, the translated message used to process a call related to the telephone number.

19. A system for providing connectivity between a first network using a first protocol and a second network using a second protocol, the system comprising:
a computer;
a first network interface communicably coupling the computer to the first network;
a second network interface communicably coupling the computer to the second network; and
a computer program resident on the computer comprising a code segment for:
receiving a message from either the first network or the second network, the message related to information about a telephone number, the message sent using the telephone number;
whenever the message is received from the first network, translating the processed message into the second protocol and sending the translated message to a destination in the second network; and
whenever the message is received from the second network, translating the message into the first protocol, processing the translated message by a line information database and sending the translated message to a destination in the first network, the translated message used to process a call related to the telephone number.

* * * * *